United States Patent [19]

Reiner et al.

[11] Patent Number: 4,529,385
[45] Date of Patent: Jul. 16, 1985

[54] EDUCATIONAL PLAYSET

[75] Inventors: Lawrence Reiner, Woodbury; Arthur Albert; Judy Albert, both of Oyster Bay, all of N.Y.

[73] Assignee: Selchow & Righter Company, Holbrook, N.Y.

[21] Appl. No.: 579,583

[22] Filed: Feb. 13, 1984

[51] Int. Cl.³ .............................................. G09B 00/00
[52] U.S. Cl. .................... 434/171; 273/157 R; 434/172; 446/101; 446/117; 446/125; 446/127
[58] Field of Search ............... 434/172, 171, 403, 195; 273/157 R; 40/605; 446/101, 117, 431, 125, 127

[56] References Cited

U.S. PATENT DOCUMENTS

| | | |
|---|---|---|
| 171,884 | 1/1876 | Taylor .................................. 434/172 |
| 176,144 | 4/1876 | McDougall ......................... 273/282 |
| 1,207,129 | 12/1916 | Bonte ................................. 434/172 |
| 1,327,775 | 1/1920 | Platt .................................... 434/172 |
| 2,680,306 | 6/1954 | Moyer ................................. 434/195 |
| 2,723,124 | 11/1955 | Martin ........................ 273/157 R X |
| 2,932,518 | 12/1957 | Burros ................................. 273/293 |
| 3,137,967 | 6/1964 | Flieth ......................... 273/157 R X |
| 3,212,201 | 10/1965 | Jensen ............................. 434/191 X |
| 4,003,144 | 1/1977 | Maddestra et al. ................. 434/403 |
| 4,136,480 | 1/1979 | Fabricant .................... 273/157 R X |
| 4,165,077 | 8/1979 | Falcione ............................. 273/239 |
| 4,345,762 | 8/1982 | Lebelson . |

FOREIGN PATENT DOCUMENTS

| | | |
|---|---|---|
| 831817 | 6/1938 | France ............................... 434/171 |
| 1027982 | 5/1966 | United Kingdom . |
| 1429797 | 12/1973 | United Kingdom . |
| 2063693 | 6/1981 | United Kingdom . |

Primary Examiner—William H. Grieb
Attorney, Agent, or Firm—Watson, Cole, Grindle & Watson

[57] ABSTRACT

A system of interlocking keyed play pieces is adapted for receiving and displaying indicia bearing tile members. Each of the play pieces is provided with a display window through which the tiles may be viewed. The pieces may be interconnected both laterally and longitudinally to enable a child to interconnect the play pieces in an infinite number of combinations so as to form a multitude of structures of varying configurations.

19 Claims, 22 Drawing Figures

EDUCATIONAL PLAYSET

BACKGROUND OF THE INVENTION

1. Field of the Invention

This invention relates generally to a playset for children, and more particularly, to a system of interlocking keyed play pieces adapted for receiving and displaying indicia bearing tiles.

2. Description of the Prior Art

In the field of educational toys, a common problem has arisen wherein a child rapidly becomes bored and loses interest in such toys. This is often caused by the inability of the toys to capture and stimulate the attention and imagination of the child. Moreover, due to the relatively fixed or inflexible nature of many prior art toys, it has been difficult to maintain the child's interest. Attempts to maintain a child's interest in educational toys have been tried, however, such attempts have been less than completely successful.

U.S. Pat. No. 1,207,129 to Bonte discloses a plurality of toy pieces each resembling a human figure provided with surfaces for displaying letters and figures. While the toy figures may be stacked one upon the other, no mechanism is provided for interconnecting the pieces and the pieces are not adapted for receiving indicia bearing tile members.

While game pieces have been formed for receiving indicia bearing tile members as disclosed in U.S. Pat. No. 2,932,518 to Burros, no mechanism is disclosed for interconnecting such game pieces. The game pieces of Burros each have a body member preferably of rectangular configuration including a slideway extending therethrough and adapted to receive a slideable member which bears game playing indicia.

Falcione discloses in U.S. Pat. No. 4,165,077 a word game having an indicia bearing tile support structure of fixed configuration including at least one row and at least one column. The tiles are held to the structure by magnetizable material.

Accordingly, there exists a need for a toy capable of interconnecting a plurality of tile receiving members in a substantially infinite number of configurations so as to maintain a child's interest over prolonged periods of time.

SUMMARY OF THE INVENTION

Accordingly, this invention has been made to overcome the problems described above, and therefore, has an object to provide a playset having a plurality of interconnectable elements, each of which is adapted to receive an indicia-bearing tile member. The indicia on the tiles may include alphabetical or numerical characters so as to enable a child to gain an appreciation for word construction.

A further object is to provide a structure capable of displaying a model word so as to allow a child to match tiles bearing alphabetic characters with each of the letters of the model word so as to foster an appreciation of word formation.

Another object is to maximize a child's interest in a toy by providing a playset capable of forming words as well as forming structures of varying configurations to serve the dual purpose of a construction set and an educational toy.

The foregoing and other objects are achieved according to the present invention by the provision of a playset including a plurality of elements, each forming a nest for receiving and retaining indicia-bearing tile members. Keying members are provided on each of the elements for mutual interconnection therebetween. Windows are formed in each of the members to allow for the viewing of any characters provided on the tile members. The keying mechanisms are typically provided on all four sides of each element in order to maximize the number of combinations and configurations which may be formed by the interconnection of the elements.

BRIEF DESCRIPTION OF THE DRAWINGS

Various other objects, features and attendant advantages of the present invention will be more fully appreciated as the same becomes better understood from the following detailed description when considered in connection with the accompanying drawings, in which like reference characters designate like or corresponding parts through the several views and wherein.

DETAILED DESCRIPTION OF THE PREFERRED EMBODIMENT

The apparatus developed in accordance with the present invention will now be described in conjunction with the accompanying figures, within which, for example, in FIG. 1 a body member 1 is shown which is typically formed of a first body section 3 and a second body section 5. The body sections 3,5 may be formed of injection molded plastic and interconnected by, for example, sonic welding, or any other well known method. The body member 1 includes a first head member 7 which serves as a projecting connection keying member. A second head member 9 is disposed in a corresponding opposing position on the second body section 5. In this manner, a bifurcated keying head section is formed.

The body member 1 further includes a first leg portion 11 and a second leg portion 13. A keying bar 15 is provided along a first side of the body member 1 while a keying groove 17 is formed along the opposite side of the body member 1 from the keying bar 15. A socket section 19 is formed between the first and second leg members 11,13. The body member 1 is formed with an apertured window section 21, the purpose of which will be described below. A support ledge 23 is provided within body member 1 along the bottom portion of the window section 21, and a rear wall 25 may be provided within the body member 1 adjacent the window section 21. Guide ribs 27 may be formed along rear wall 25, while opposing side walls 29 may be formed adjacent opposing sides of the window section 21.

Shoulder sections 31 may be formed on the element 1 to project laterally from the bifurcated head members 7,9. A guide slot such as guide slot 33 is formed between the bifurcated head sections 7,9 for receiving an indicia-bearing tile member 35 as shown in FIG. 1. The tile member 35 is typically inserted by hand through the guide slot and into the interior section of the body member 1. Tile member 35 is guided by the guide ribs 27 and side walls 29 during insertion, and rests upon and is secured and supported by support ledge 23. In this manner, tile member 35 is aligned with window section 21 such that the window section provides a clear view of any characters, such as alphabetic or numeric characters, disposed upon the tile member 35.

A reinforcing support rail 37 may be formed along the inner peripheral edge of head members 7,9 so as to strengthen such head members and to further serve as a registration and keying mechanism. The reinforcing support rail 37 forms a stepped section 39 between the reinforcing rail and the top edge of the head members 7,9. In this manner, the outer edge of the stepped section 39 forms a flange 40 which further serves to register and support the head members 7,9 within a socket of another body member formed substantially identical to socket 19 as shown formed between legs 11 and 13 of body member 1.

Figure 1:
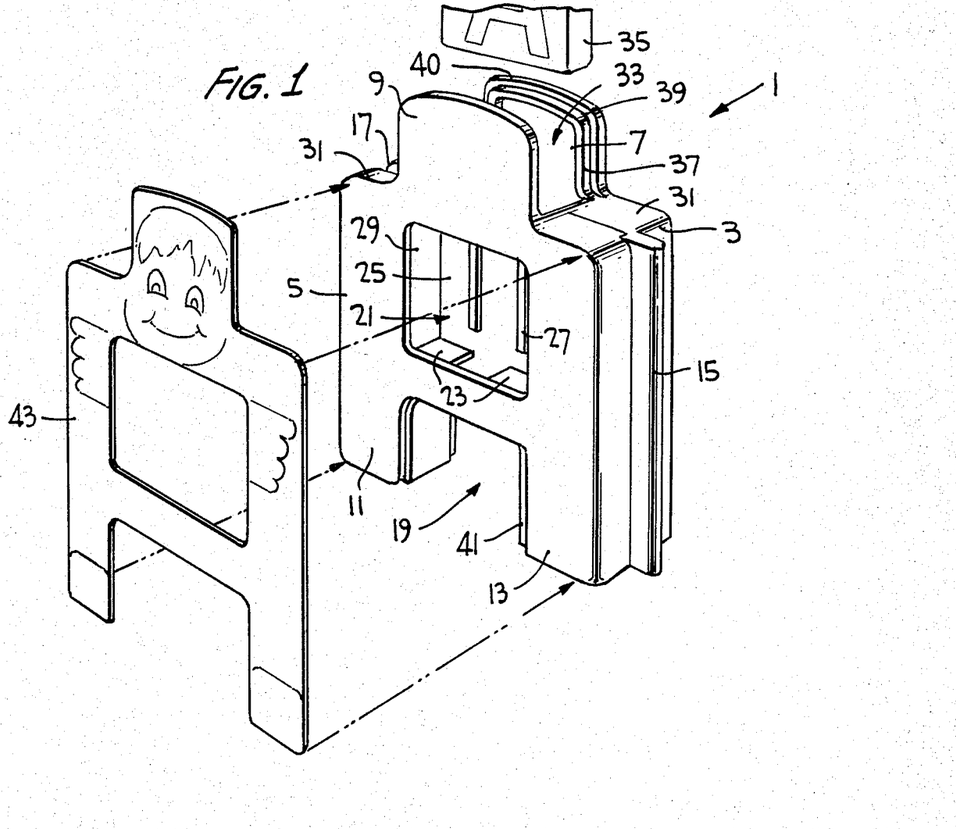
FIG. 1 is a perspective view of a preferred embodiment of a playset element representative of an animate object such as a human figure.

As further depicted in FIG. 1, a recessed keying groove 41, which is dimensioned to correspond to the shape of the peripheral edge of head members 7,9, is formed between the leg members 11,13 adjacent the socket section 19. In this manner, the bifurcated head members 7,9 of one element 1 may be inserted within a correspondingly shaped socket section 19 formed in another body member 1 so as to provide for the interconnection and stacking of a plurality of such body members. The support flange 40 formed by the peripheral edges of the head members 7,9 registers within the recessed keying grooves 41 so as to align one body member with another in a planar relationship. Such stacking capability is clearly shown in FIG. 2a wherein body member 1a is shown stacked upon body member 1 such that the leg members 11,13 of body member 1a rest upon the shoulders 31 of body member 1. An adhesive face plate 43 displaying a human or animal figure may be applied to either or both sides of body member 1. Alternatively, the figures may be printed directly on the body member 1.

Figure 2:
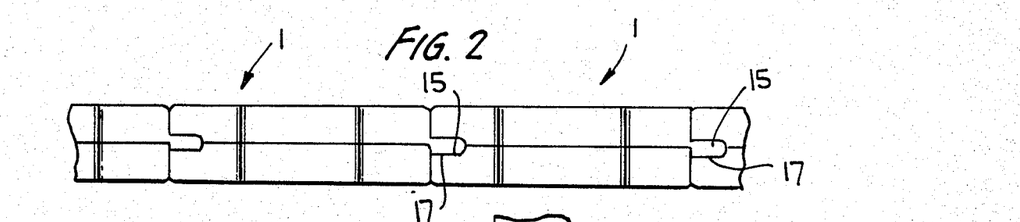
FIG. 2 is a plan view showing one manner in which a series of elements, each similar to the element shown in FIG. 1, may be mutually interconnected.

FIG. 2 depicts the lateral interconnection of a plurality of elements 1 via keying bar 15 and keying grooves 17. It can be appreciated that the keying bar 15 of one body member 1 is merely inserted snugly within the correspondingly shaped keying groove 17 of an adjacent body member so as to align a plurality of body members seriatim. It can be appreciated that in this manner a plurality of indicia-bearing tile members may be aligned in a manner so as to form a word. That is, the indicia-bearing tile members 35 may display alphabetic characters such that the interconnection of a plurality of body members will form a word.

Figure 2A:
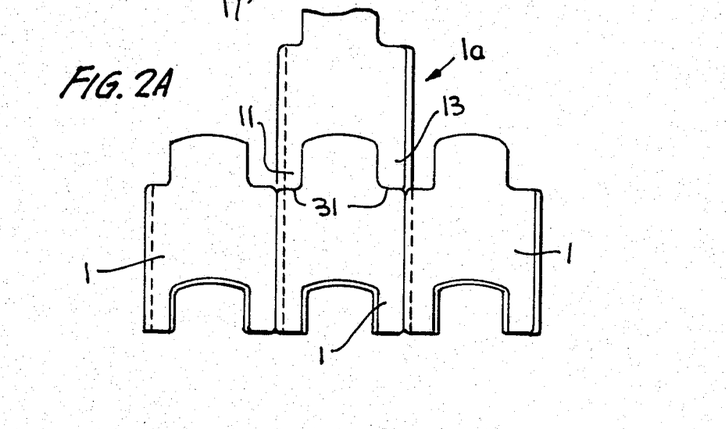
FIG. 2A is a front elevation view showing the lateral and longitudinal interconnection capabilities of a plurality of elements, each similar to the element shown in FIG. 1.

FIG. 2A also shows the lateral interconnection of a plurality of body members 1 in addition to the longitudinal stacking of body members 1 and 1a. Thus, it can be seen that, given a supply of a plurality of body members 1, it is possible to arrange and stack such body members in an almost infinite number of patterns and configurations thereby stimulating and maintaining a child's interest in the playset.

Figure 3:
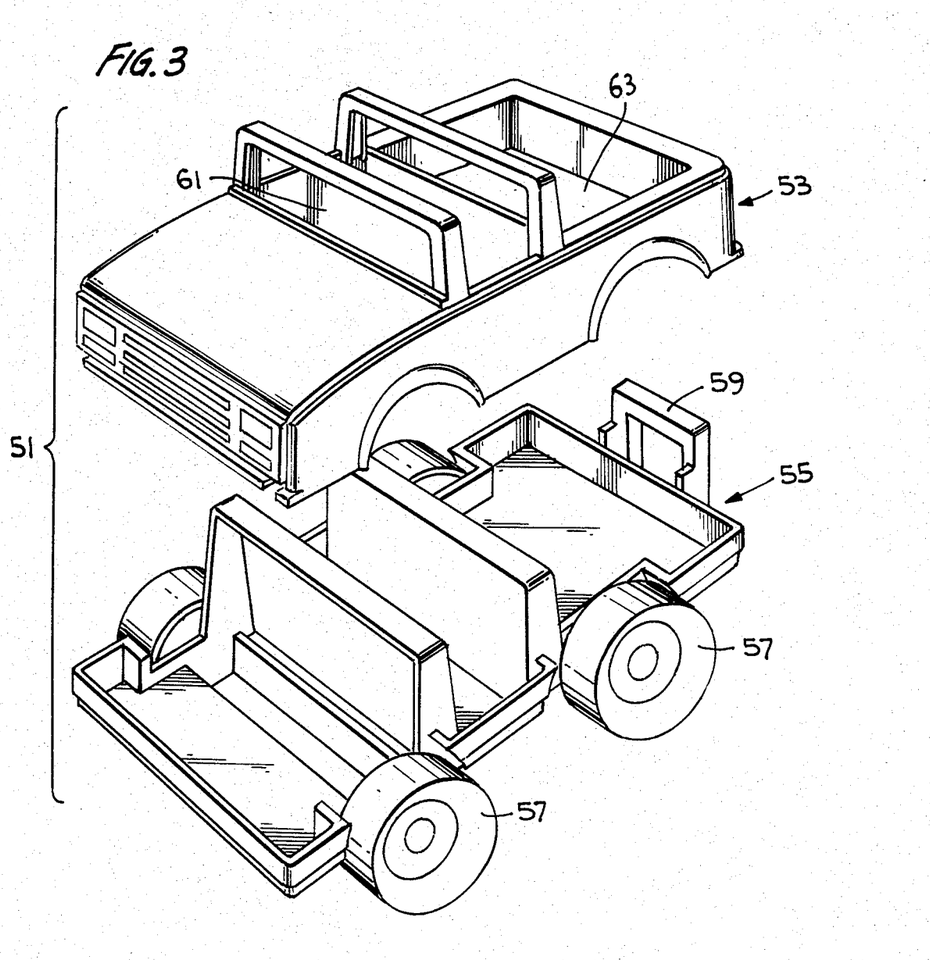
FIG. 3 is a partially exploded perspective view of a toy car.
Figure 4:
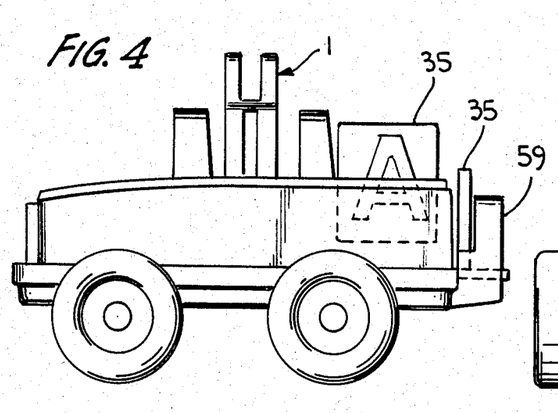
FIG. 4 is a side elevation view of the toy car of FIG. 3 showing its adaptation for transporting an element such as that shown in FIG. 1 as well as transporting indicia-bearing tile members.
Figure 5:
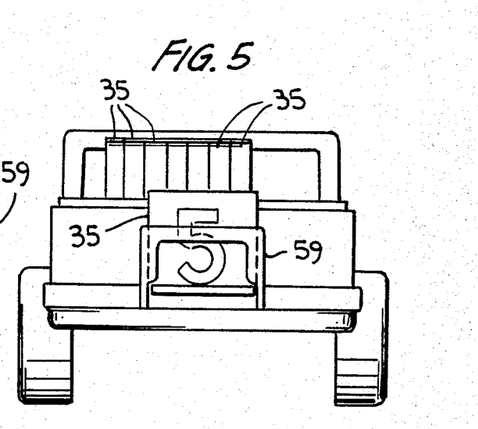
FIG. 5 is a rear elevation view of the toy car of FIG. 3 showing its capability to transport a plurality of tile members and its adaptation to display a tile member in the manner of a license plate.

FIGS. 3 through 5 show an embodiment of a toy car adapted to receive both the body members 1 along with a plurality of tile members 35. As shown in FIG. 3, the toy car 51 includes a car body portion 53 adapted to fit upon the chassis portion 55. Car wheels 57 are rotatingly secured to the chassis portion 55 to allow the toy car 51 to roll along a support surface. A support rail 59 is formed in the shape of a license plate holder or alternatively in the shape of a rumble seat and is dimensioned to snugly receive a tile member 35 as best shown in FIGS. 4 and 5. The car body portion 53 includes a front passenger compartment 61 dimensioned to receive a body member 1 as shown in FIG. 4. The car body portion 53 also may include a rear storage compartment 63 dimensioned to receive a plurality of tile members 35 as further shown in FIGS. 4 and 5. Thus, the toy car 51 may be used to transport both the body member 1 along with a plurality of tile members 35 while displaying at least one tile member 35 in the manner of a license plate.

Figures 6, 7, 8, 9, 10:
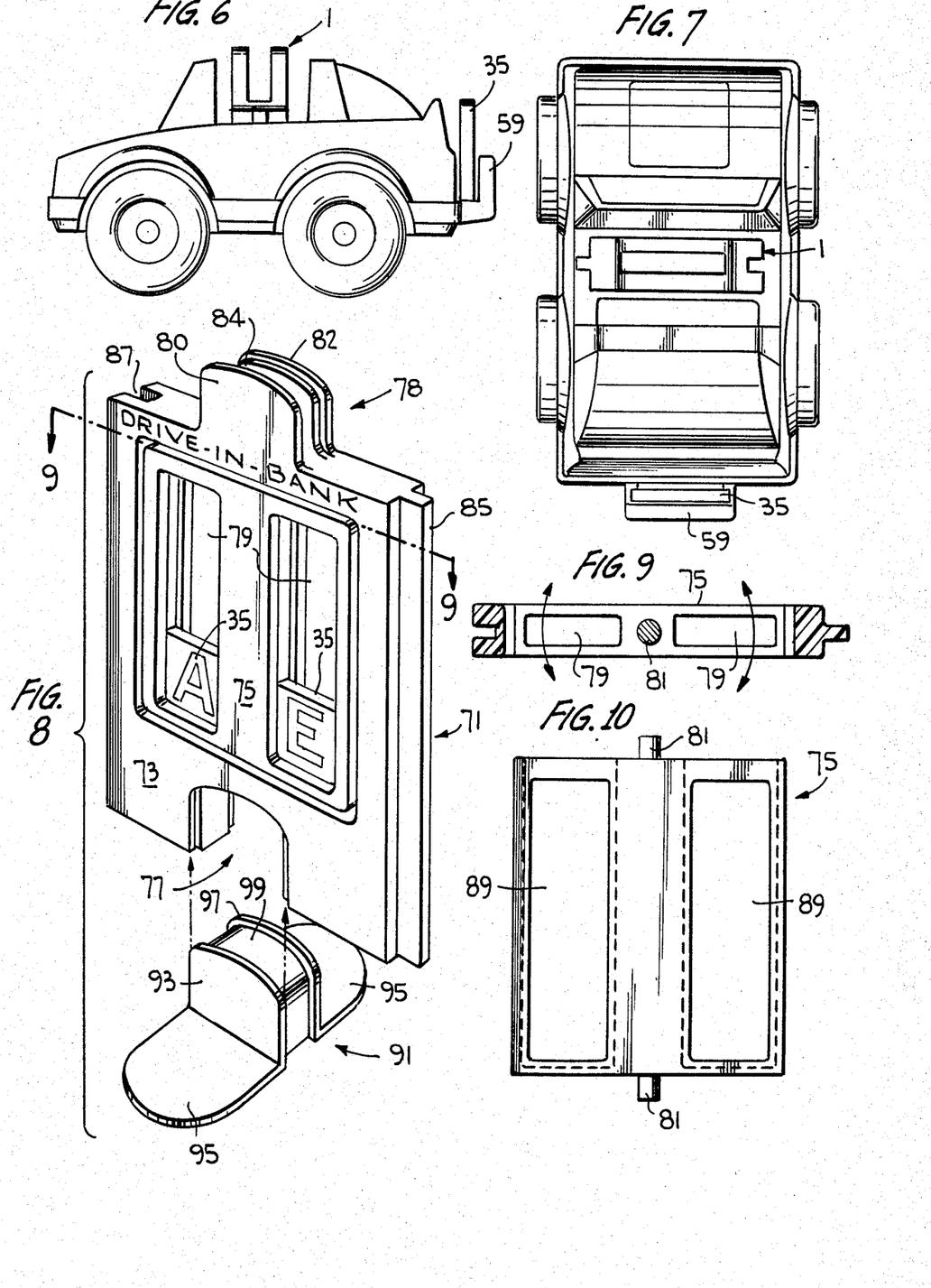
FIG. 6 is a side elevation view of a modified sports car version of the toy car of FIG. 3.
FIG. 7 is a plan view of the sports car of FIG. 6.
FIG. 8 is a perspective view of a toy drive-in bank facade adapted to receive a support foot.
FIG. 9 is a sectional view taken along lines 9—9 of FIG. 8 showing the rotational capabilities of the bank depository section.
FIG. 10 is a front elevation view of the rotating bank depository section of the facade of FIG. 8.

FIG. 6 depicts an alternate embodiment of the toy car representative of a sports car. As shown in FIG. 7, the sports car is formed without a rear storage compartment but is adapted to receive with a relative snug fit a single body member 1 and is further adapted to display a tile member 35 in the manner of a license plate as discussed above.

FIGS. 8 through 11 depict a panel-shaped assembly representative of a toy drive-up bank 71. The drive-up bank 71 includes a stationary bank facade section 73 and a movable rotating bank depository section 75. As shown in FIG. 8, the drive-up bank 71 is provided with a socket section 77 dimensioned substantially the same as socket section 19 formed in body member 1 as shown in FIG. 1. In addition, the facade section 73 is further formed with a projecting head member 78 including a first head member 80 and a second head member 82. The first and second head members 80,82 are mutually opposed and define therebetween a guide slot 84 in the same manner as that described above with respect to body member 1. The projecting head member 78 acts as a keying mechanism for interconnection with other playset elements including the body member 1. It should be further noted that the head sections 80,82 of projecting head member 78 are formed substantially identical to the first and second head members 7,9 of body member 1.

The bank facade section 73 is further provided with a keying bar 85 projecting from a first side of the facade section 73 and includes a keying groove 87 adapted to receive a keying bar such as keying bar 85 which may be formed on another similar drive-up bank or such as keying bar 15 of body member 1. Keying bar 85 and keying groove 87 are formed substantially the same as keying bar 15 and keying groove 17 of body member 1 so as to result in a modular playset construction wherein each element is readily adaptable to interconnect with any other element in a plurality of configurations. The lengths of the various keying bars and grooves may, however, vary.

As shown in FIG. 9, the bank depository section 75 includes slideways 79,79 for receiving a plurality of tiles in a stacked columnar fashion. This can be appreciated from the disposition of the tiles 35 shown in FIG. 8 which are snugly nested within the slideways 79,79. As further shown in FIG. 9, the bank depository section 75 is provided with trunions or pivots 81. The trunions 81 are further shown in FIG. 10 and may be fitted within corresponding apertures formed in the bank facade section 73 in such a manner as to allow for the rotation of the bank depository section 75 within the bank facade section 73.

The front of the bank depository section 75 is shown in FIG. 10 to clearly depict the provision of window sections 89 formed along one side of the slideways 79,79 to allow for viewing of the stacked tile members 35 disposed therein. Thus, a child may make a deposit of one or more tile members within the drive-up bank 71 by directing the toy car as shown in FIG. 3 to a position adjacent the drive-up bank 71 and removing one or more tiles 35 from the rear storage compartment 63 and depositing the tiles within the slideways 79,79.

Figures 11, 12, 13, 14:
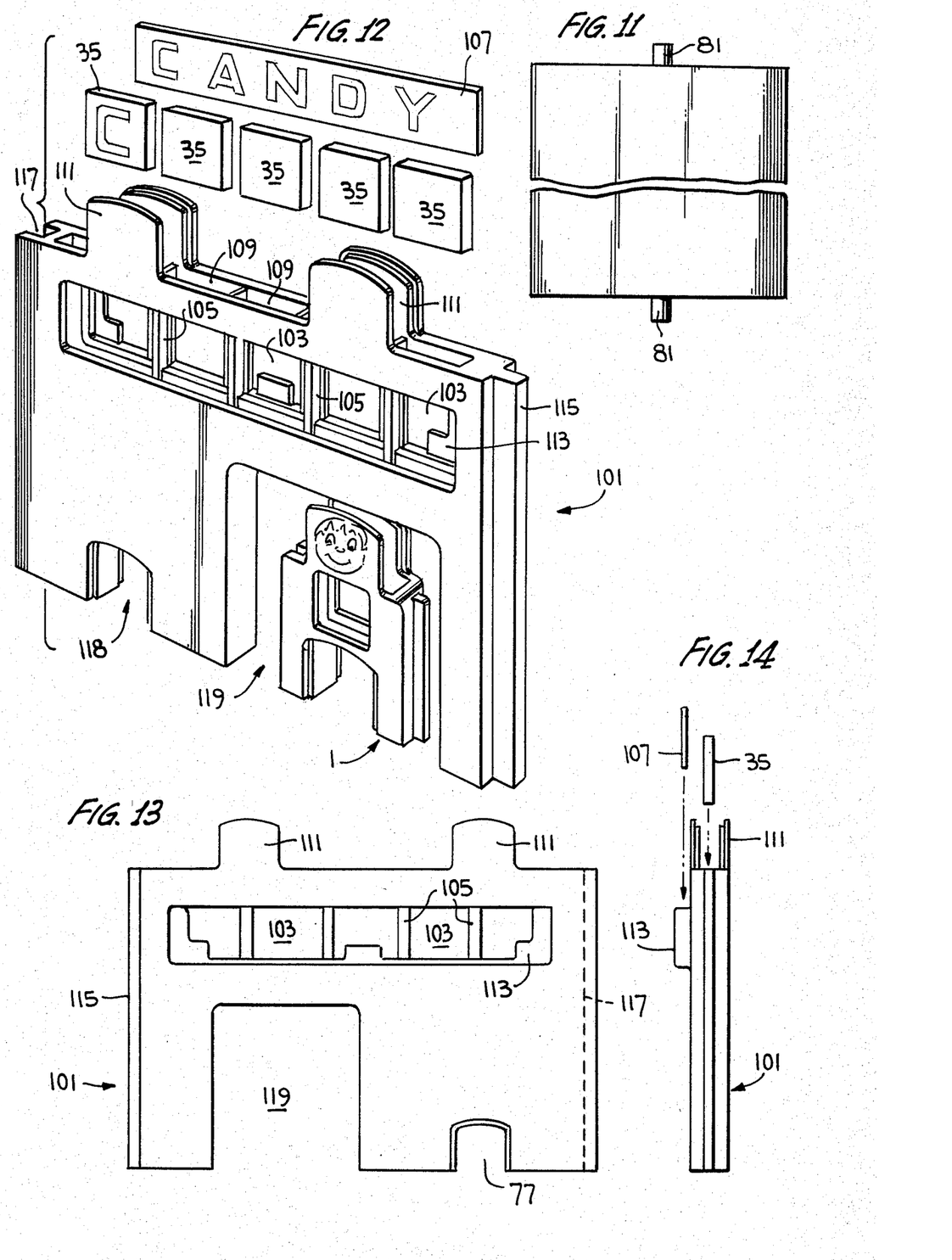
FIG. 11 is a rear elevation view of the bank depository section of FIG. 10.
FIG. 12 is a schematic perspective view of a store front facade depicting the relative positioning of a word card, tile-indicia bearing members, and an element as shown in FIG. 1.
FIG. 13 is a rear elevation view of the store facade of FIG. 12 showing a card rack for receiving a word card.
FIG. 14 is a side elevation view of the store facade of FIG. 12 showing the relative placement of the word card and the tile members within the facade.

As shown in FIG. 11, the rear of the bank depository section 75 may be provided with a wall so that upon rotation of the depository section 75 within the facade section 73, the tile members 35 may either be brought into view or removed from view.

As further shown in FIG. 8, a support foot member 91 is formed with a saddle section 93 and pedestal sections or foot sections 95. The saddle section 93 is dimensioned substantially the same as the first and second head members 7,9 of body member 1 and the first and second head sections 80,82 of the drive-up bank 71. The saddle section 93 is provided with a support flange 97 dimensioned similar to support flange 40 shown in FIG. 1. The saddle section 93 of the support foot 91 may be provided with a support surface 99.

Thus, the structure of support foot 91 is adapted to interconnect with any of the socket sections of any of the playset elements such as socket section 19 of body member 1 and socket section 77 of drive-up bank 71. The support flange 97 of the support foot 91 serves the same function as the support flange 40 of body member 1, that is, to secure and align the saddle section 93 of the support foot 91 in a planar relationship with respect to any element to which it is interconnected. The foot sections 95 serve to stabilize any element to which it is connected, thereby allowing the stacking of a plurality of elements one upon the other. In addition, T-shaped structures as well as cross-shaped structures may be formed by appropriate interconnection of elements.

FIG. 12 schematically depicts a store front 101 in the form of a panel similar to that of the bank facade section 73. The store 101 is formed with a window section 103 through which spaced partition bars 105 may be seen. The partition bars 105 are provided within the store panel 101 and serve to form individual separated nests, each for receiving a tile member 35. A word card 107 may be inserted within the store panel 101 to provide a guide to which tile members 35 may be matched. As shown in FIGS. 13 and 14, a card rack 113 is provided along the rear portion of the store panel 101 to receive the word card 107. The tile members 35 are then inserted within the individual apertures 109 between the word card 107 and the window section 103 shown in FIG. 12 so as to arrange the tile members in a manner corresponding to a word formed on the word card 107.

The store panel 101 may be formed with bifurcated keying projections 111 which, in the manner indicated above, correspond to the head members 7 and 9 of body member 1 and the projecting head member 78 of drive-up bank 71. In addition, a keying bar 115 may be provided along one side of the store panel 101 while a correspnding keying slot 117 may be formed on an opposing side of the store panel 101 in the same manner as described with respect to the drive-up bank 71.

The store panel 101 may be further provided with a socket section 118 substantially the same as socket section 77 as shown in FIG. 8 and socket section 19 as shown in FIG. 1. In this manner, the projecting head section of any of the elements may be interconnected with the socket section of any of the other elements to provide for a multitude of potential structural configurations. As further shown in FIG. 12, an entrance way 119 is formed through the store panel 101 and dimensioned to allow a body member 1 to pass therethrough.

Figures 15, 16:
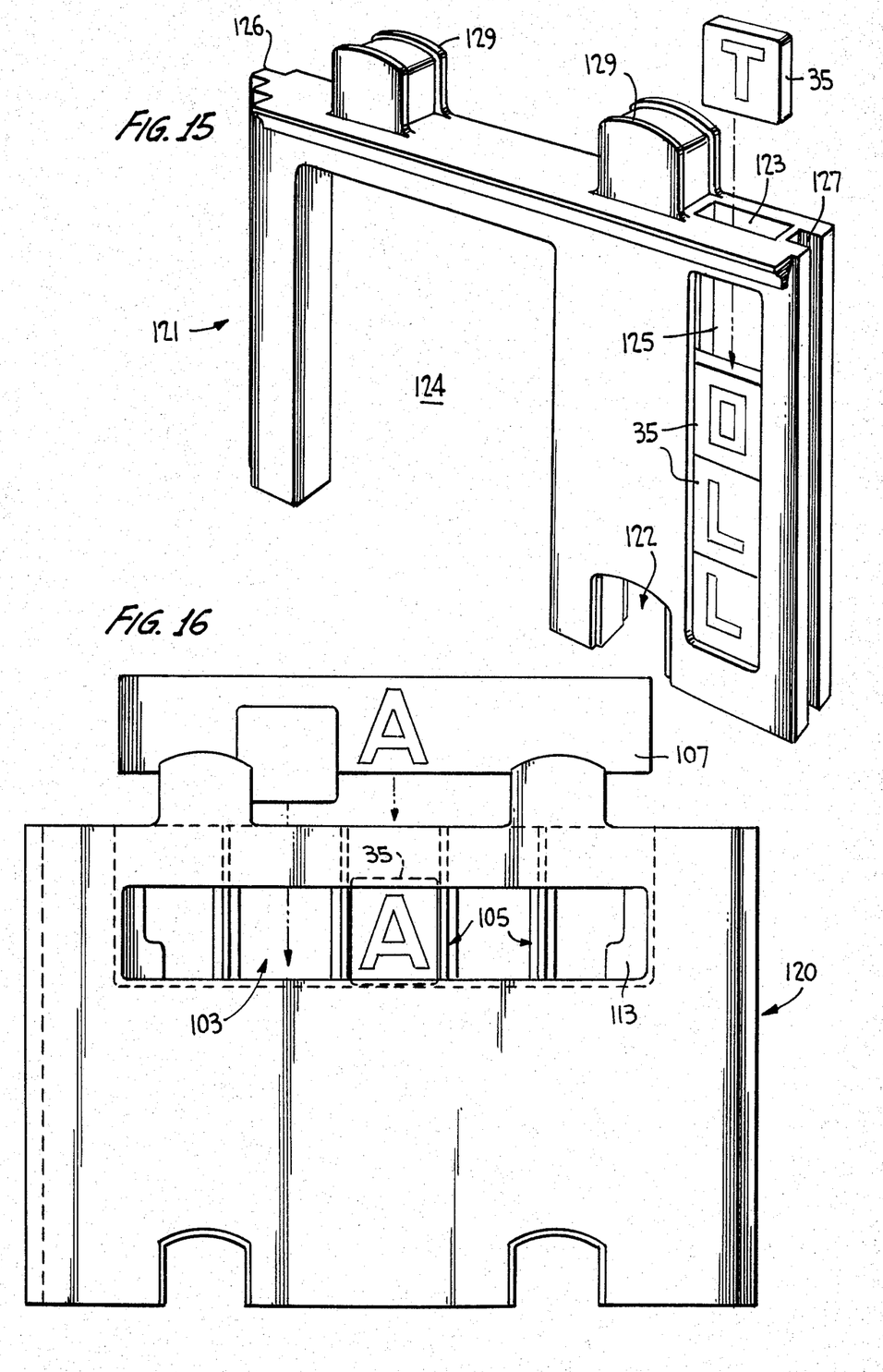
FIG. 15 is a perspective view of a toll booth adapted to receive tile members as well as to allow the passage therethrough of the toy cars of FIGS. 3 through 7.
FIG. 16 is a schematic representation of a schoolhouse facade.

Yet another configuration of a playset element is shown in FIG. 15 wherein toll booth 121 is shown to have formed therein a slideway 123 dimensioned similar to that of slideways 79,79 shown in FIG. 9. A window 125 is provided in the front section of the slideway to allow for viewing of the tile members 35 stacked therein. As with the other facade members, toll booth 121 is provided with a keying bar 126 and a keying groove 127 formed with the same dimensions as the keying bars and keying grooves discussed above.

Projecting saddle members 129 are formed similar to saddle section 93 of support foot 91 so as to allow for the interconnection of the toll booth 121 with any of the socket sections formed in any of the other elements of the playset. In addition, the toll booth 121 is further provided with its own socket section 122. An archway 124 is formed within the toll booth 121 having a sufficient height and width to allow either of the toy cars shown in FIGS. 3 through 7 to pass therethrough. Thus, one of the toy cars may be driven up to the toll booth 121 and one of the tile members 35 may be removed from the car and deposited within the slide way 123 as schematically shown in FIG. 15 thereby representing the payment of a toll.

Figures 17, 18, 19, 20, 21:
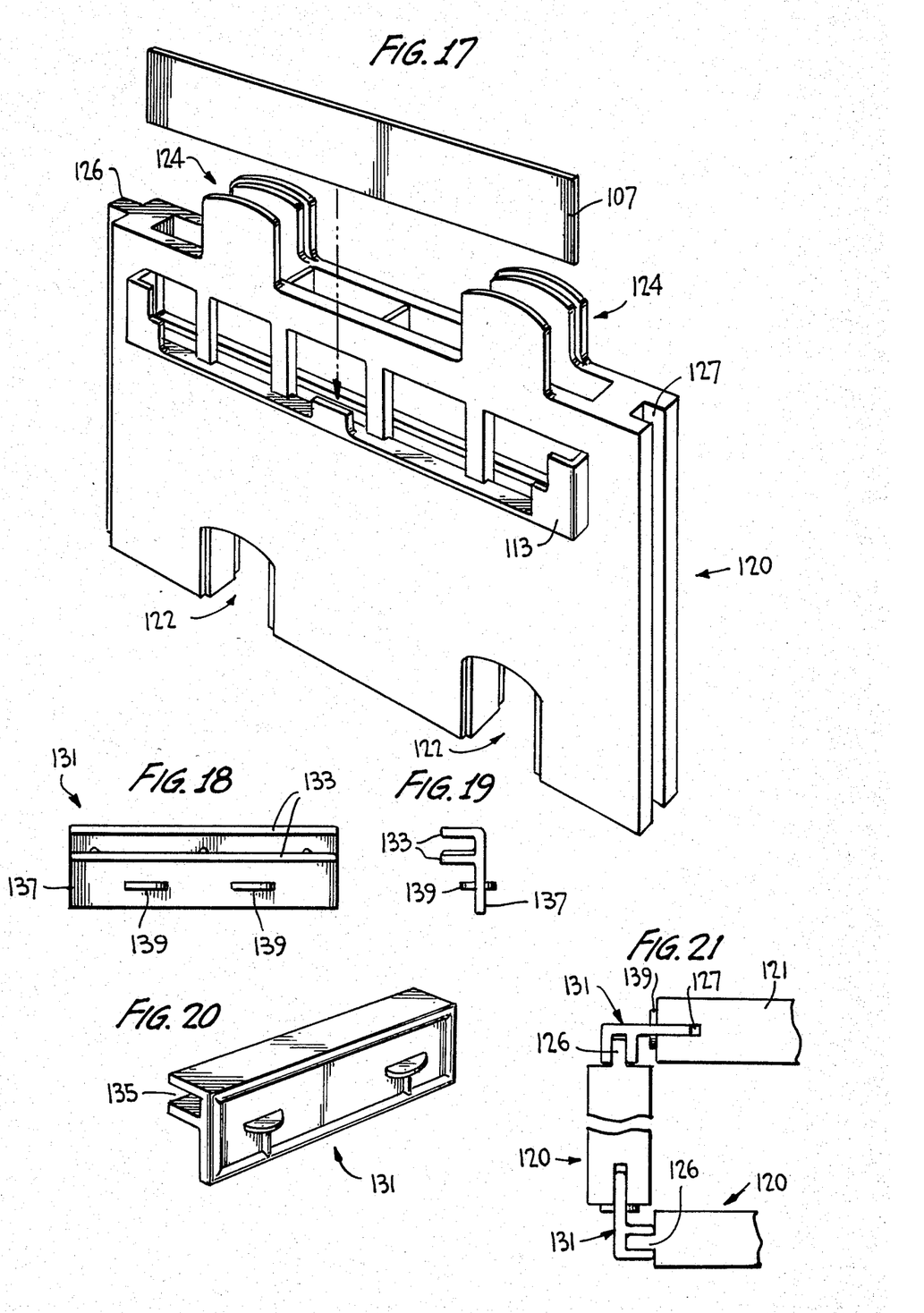
FIG. 17 is a rear perspective view of the facade of FIG. 16 showing the relative placement of a word card within a card rack.
FIG. 18 is a front elevation view of a connecting bracket for interconnecting facades and elements such as shown in FIGS. 1 and 17.
FIG. 19 is a side elevation view of the connecting bracket of FIG. 18.
FIG. 20 is a rear perspective view of the connecting bracket of FIG. 18.
FIG. 21 is a plan schematic representation of the interconnection of a plurality of facades using a plurality of connecting brackets such as shown in FIGS. 18 through 20.

A facade panel 120 representative of a school is shown in FIGS. 16 and 17. The panel 120 includes a keying bar 126 and a keying groove 127, each the same as discussed in connection with the toll booth of FIG. 15. The school 120 may include a window section 103 having spaced partition bars 105 for forming a plurality of individually spaced nests for receiving the tile members 35 in a manner substantially the same as that discussed in connection with the store shown in FIG. 12. In addition, the school includes at least one standardized socket section 122 and standardized bifurcated head section 124 which are substantially the same as those bifurcated head sections shown in FIG. 1. The word card 107 provided with the school serves the same function as the word card provided with the store shown in FIG. 12.

FIGS. 18 through 20 depict a connecting bracket 131 having an F-shaped cross section as best seen in FIG. 19. The connecting bracket includes keying walls 133 which form therebetween a keying groove 135 having a cross section substantially the same as that of keying groove 127 and keying groove 17 respectively shown in FIGS. 17 and 1. In addition, a keying bar 137 is provided along a surface perpendicular to the keying walls 33 to serve the same function as the keying bars 126 and 15 respectively shown in FIGS. 17 and 1. The connecting bracket 131 is further provided with depth registration tabs 139 which serve to limit the penetration of the keying bar 137 into any of the keying slots such as keying slot 127.

As shown in FIG. 21, a facade panel such as school panel 120 may be interconnected to an identical panel 120 along with, for example, a toll booth 121 via connecting brackets 131. As shown, the depth registration tabs 139 not only serve to limit the penetration of the keying bars 137 within the panels, but also serve to maintain the interconnected panels in a relatively orthogonal relationship. Furthermore, the connecting brackets orient one panel with respect to another so as to form an interconnected structure wherein the inner corner sections of each structure are substantially contiguous as shown in FIG. 21. As each of the playset elements is typically formed of injection molded plastic as noted above, each element typically will have a hollow interior. Thus, the connecting brackets 131 provide for the construction of a neat and orderly playset arrangement by accurately aligning interconnected pieces.

In light of the above description, it can be appreciated that the invention incorporates a playset which serves as a teaching tool as well as a construction toy so as to foster an appreciation for special building concepts in addition to fostering an appreciation of the alphabet as well as the formation of words. Each of the elements may be linked together side by side or one upon the other. The building facade, which may be formed of various bright colors, may be interconnected so as to create a village for the elements such as shown in FIG. 1 which are representative of people or animals.

Obviously, numerous modifications and variations of the present invention are possible in light of the above teachings. It is therefore to be understood that within the scope of the appended claims, this invention may be practiced otherwise than as specifically described herein.

What is claimed as new and desired to be secured by Letters Patent of the United States is:

1. An educational playset which comprises
a plurality of body elements, each body element including a front face, a rear face, a top side, a bottom side and opposite lateral sides; said top side being configured to provide separated shoulder sections and a head member which extends outwardly from said body element, said bottom side including a socket section extending therein which is configured to correspond to the shape of said head member, one of said two opposite lateral sides being configured to provide a keying bar extending outwardly therefrom, and the second of said two opposite lateral sides including a keying groove therein which is configured to correspond to the shape and length of said keying bar; and wherein each body element includes a guide slot extending partly therethrough between said top side and said bottom side and wherein a window is provided in said front face thereof which communicates with said guide slot, and
a plurality of tile elements with indicia thereon, each of said tile elements being shaped to slidingly fit within the guide slot in any one of said plurality of body elements such that the indicia thereon will be viewable through the window of the body element in which it is positioned.

2. The educational playset as defined in claim 1, wherein the bottom side of each said plurality of body elements is configured to provide two spaced-apart legs, said socket section being formed between facing surfaces of said legs.

3. The educational playset as defined in claim 1, wherein the head member of each of said plurality of body elements includes a front flange, a rear flange and a recessed support surface therebetween, wherein the portions of the bottom side of each of said plurality of body elements which forms said socket section therein includes recessed edges adjacent the front and rear faces of said body element, and wherein the socket section of a first body member will fit on the head member of a second body member such that the recessed edges in the bottom side of the first body member will abut the front and rear flanges of the head member of the second body member.

4. The educational playset as defined in claim 1, wherein said guide slot extends downwardly through said head member and toward said bottom side, said head member being thus comprised of a front head portion and a rear head portion.

5. The educational playset as defined in claim 4, including means on the front face thereof providing a human or an animal caricature.

6. The educational playset as defined in claim 1, including a support means for supporting at least one of said plurality of body elements.

7. The educational playset as defined in claim 6, wherein said support means comprises a saddle member and a foot member projecting from said saddle member, said saddle member being shaped and dimensioned to fit with a socket section of a body member.

8. The educational playset as defined in claim 6, wherein said support means comprises a toy car.

9. The educational playset as defined in claim 8, wherein said toy car includes a storage means for receiving and storing a plurality of said tile members.

10. The educational playset as defined in claim 8, wherein said toy car includes a mounting means for mounting and displaying at least one of said tile members.

11. The educational playset as defined in claim 1, wherein some of said body elements are shaped so as to represent buildings.

12. The educational playset as defined in claim 11, wherein at least one of said body elements which are shaped to represent buildings includes indicia on its front face representative of a bank.

13. The educational playset as defined in claim 12, wherein each of said body elements that includes indicia on its front face representative of a bank includes a depository section which includes at least two guide slots therein, each of said guide slots forming a slideway in which a plurality of said tile members can be stacked.

14. The educational playset as defined in claim 13, wherein each depository section includes pivot means connecting it to its associated body member so as to be rotatably mounted therein.

15. The educational playset as defined in claim 11, wherein at least one of said body elements which are shaped to represent buildings is shaped to represent a store front.

16. The educational playset as defined in claim 15, wherein each of said body elements shaped to represent a store front includes a plurality of guide slots extending downwardly therein from its top surface, said guide slots being separated by partition bars, thus forming a plurality of nests, and wherein said window in the front thereof is horizontally elongated so as to communicate with each of said plurality of guide slots.

17. The educational playset as defined in claim 16, wherein each of said body elements shaped to represent a store front includes a horizontally elongated window in its rear face which communicates with each of said plurality of guide slots, said horizontally elongated window in said rear face being in register with the horizontally elongated window in said front face, and wherein each said body element shaped to represent a store front face includes a support rack attached to the rear face thereof below the horizontally elongated window therein, and wherein said playset includes elongated word cards which are positionable in a respective support rack.

18. The educational playset as defined in claim 1, including bracket means for interconnecting two said body elements.

19. The educational playset as defined in claim 18, wherein each said bracket means comprises a generally F-shaped member.

* * * * *